United States Patent [19]
Ticknovich

[11] Patent Number: 6,131,684
[45] Date of Patent: Oct. 17, 2000

[54] CUSHIONED BUSHING FOR AN ARTICULATED MOTORCYCLE FRAME

[76] Inventor: Philip Ticknovich, 18721 Hart Lake Road, Caledon, Ontario, Canada, L0N 1C0

[21] Appl. No.: 09/261,795

[22] Filed: Mar. 3, 1999

[51] Int. Cl.[7] ................................................. B62K 25/12
[52] U.S. Cl. ........................... 180/227; 280/284; 384/125
[58] Field of Search ..................................... 180/219, 227; 280/284, 285; 384/125, 202, 262

[56] References Cited

U.S. PATENT DOCUMENTS

| | | | |
|---|---|---|---|
| 1,526,632 | 2/1925 | Fischback | 384/125 |
| 4,053,034 | 10/1977 | Katzer | 188/206 R |
| 4,907,814 | 3/1990 | Foster | 280/104 |
| 5,390,758 | 2/1995 | Hunter et al. | 180/228 |
| 5,487,443 | 1/1996 | Thurm | 280/227 |
| 5,749,591 | 5/1998 | Thurm | 280/284 |

*Primary Examiner*—Kevin Hurley
*Attorney, Agent, or Firm*—Phillips, Lytle, Hitchcock, Blaine & Huber LLP

[57] ABSTRACT

An improved motorcycle frame (20) has a first part (21) and a second part (23) mounted for pivotal movement relative to the first part about an axis (x—x). The improvement includes a cushioned bushing (17) operatively arranged between the two frame parts for enabling pivotal movement therebetween and for damping vibrations transmitted therebetween. The bushing has a rod (45) substantially coincident with the pivotal axis; a first cushion (27) provided with a blind recess for receiving one marginal end portion of the rod; a second cushion (27') provided with a blind recess for receiving another marginal end portion of the rod; and compression means (37) for exerting axial forces on the cushions to create forces between the cushions and the rod marginal end portions. In a preferred embodiment, the cushions are made of dual-durometer urethane materials.

9 Claims, 3 Drawing Sheets

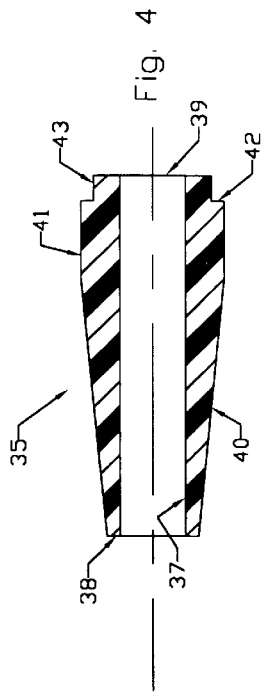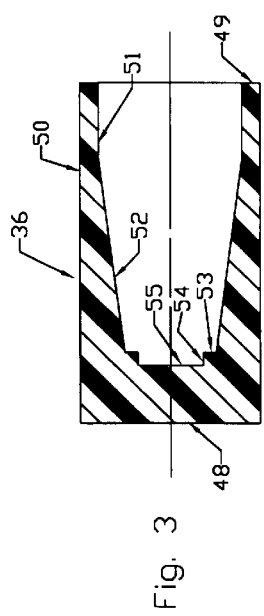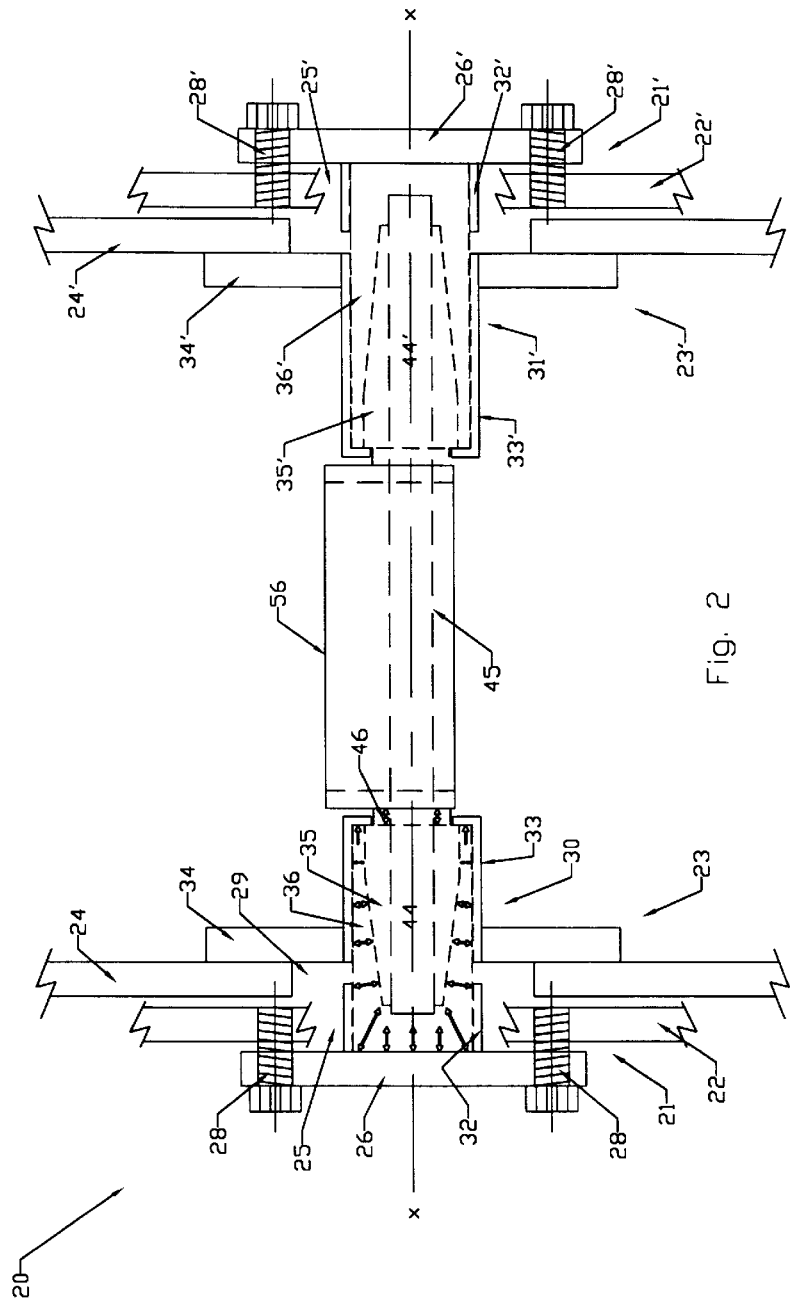

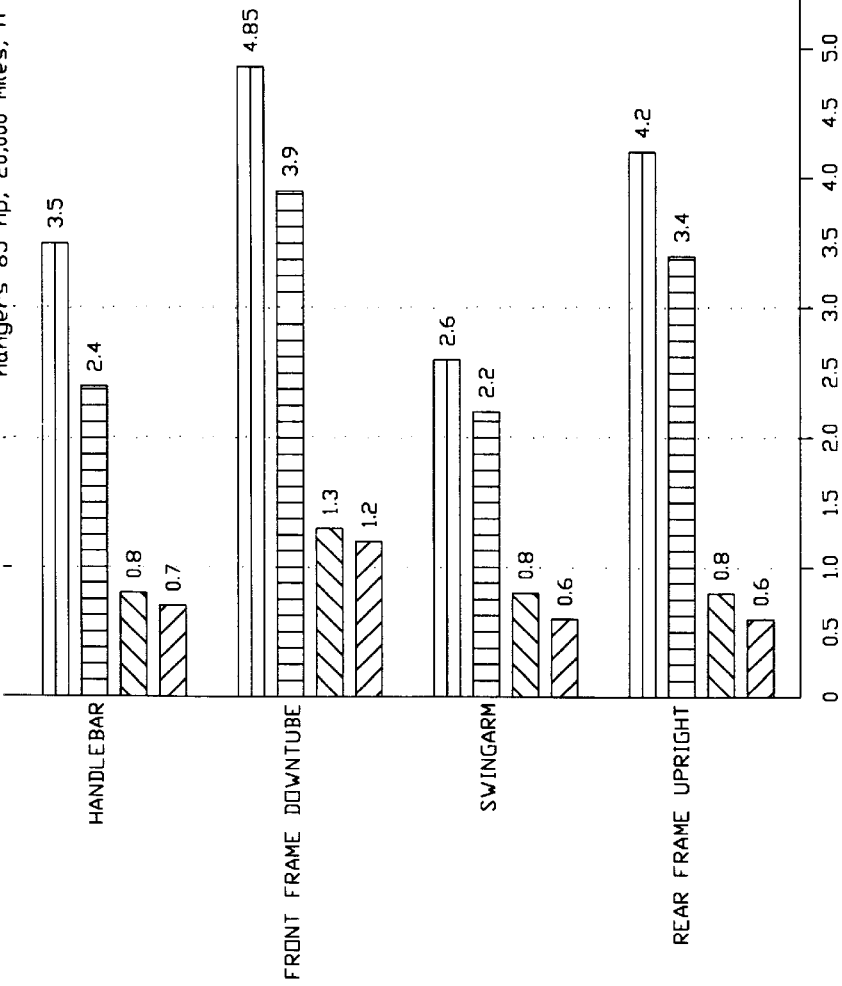

CUSHIONED BUSHING FOR AN ARTICULATED MOTORCYCLE FRAME

TECHNICAL FIELD

The present invention relates generally to motorcycles, and, more particularly, to an improved cushioned bushing joining adjacent parts of an articulated motorcycle frame for permitting relative pivotal movement between such frame parts and for damping vibrations transmitted therebetween.

BACKGROUND ART

Vibrations in motorcycles contribute to rider fatigue. In an attempt to address this problem, some manufacturers have used softer springs or more-compliant shock absorbers. However, what may be appropriate for one rider weighing, say, 120 pounds, might be inappropriate for another rider weighing, say, 300 pounds .

The principal source of such vibrations is, of course, the engine itself and irregularities in the road. Various vibratory forces are transmitted from the road through the tires and suspension to the motorcycle frame. While some riders clamor for a smooth ride, other riders want a stiff ride, and still others want a combination of the two.

At least one manufacturer, Harley-Davidson, manufactures a motorcycle having a two-piece articulated frame. This bike, known as a "Softail", has a main frame part, and a rearward frame part pivotally connected to the main frame. The rearward part carries the rear wheel. A shock absorber and spring are operatively arranged between the frame parts to reduce the transmission of vibratory forces from the rear wheel to the main frame. However, this design has a non-cushioned pivotal joint between the two frame sections. Hence, vibrations may still be transmitted from the rear wheel through this joint to the main frame.

It would be desirable to provide an improved articulated motorcycle frame that would damp vibrations transmitted to the main frame, and reduce the vibrations felt in the main frame that are attributable to the engine.

DISCLOSURE OF THE INVENTION

With parenthetical reference to the corresponding parts, portions or surfaces of the disclosed embodiment, merely for purposes of illustration and not by way of limitation, the present invention provides an improved motorcycle frame (20) having a first part (21) and having a second part (23) mounted for pivotal movement relative to the first part about an axis (x—x).

The improvement broadly includes a cushioned bushing (17) operatively arranged between the two frame parts for enabling pivotal movement therebetween and for damping vibrations transmitted therebetween. The bushing has a rod (45) substantially coincident with the pivotal axis, a first cushion (27) provided with a blind recess for receiving one marginal end portion of the rod, a second cushion (27') provided with a blind recess for receiving the other marginal end portion of the rod, and compression means (58) for exerting axial forces on the two cushions for creating forces between said cushions and the two rod marginal end portions.

In a preferred embodiment, each cushion has an inner part made of a relatively hard material, and has an outer part made of a relatively soft material. The relatively hard material may have a hardness of about 75 "D" durometer, and the relatively soft material may have a hardness of about 60–65 "A" durometer. The two cushion materials may be formed of a suitable polyurethane or the like. The inner cushion part may be formed of a suitable graphite-filled polyurethane. These two cushion parts may have facing annular, frusto-conical and cylindrical surfaces. When the bushing is compressed, forces will be transmitted between the cushion parts in directions normal to their facing surfaces. In fact, the inner cushion may be an open-ended tube such that the proximate rod marginal end portion penetrates the inner cushion and is received in the outer cushion.

Accordingly, the general object of the invention is to provide an improved motorcycle frame.

Another object is to provide an improved two-piece articulated motorcycle frame having one frame part pivotally mounted another frame part, and in which the connecting joint therebetween is cushioned to reduce the transmission of vibratory forces therebetween.

Still another object is to provide an improved articulated motorcycle frame in which the joint between the two frame parts is cushioned by a dual-durometer bushing made of suitable polyurethane materials.

These and other objects and advantages will become apparent from the foregoing and ongoing written specification, the drawings and the appended claims.

BRIEF DESCRIPTION OF THE DRAWINGS

FIG. 2 is a fragmentary vertical sectional view of the improved cushioned bushing before axial compression.

FIG. 3 is an enlarged fragmentary vertical sectional view thereof, showing the left cushion outer part in cross-section.

FIG. 4 is an enlarged fragmentary vertical sectional view thereof, showing the left cushion inner part in cross-section.

FIG. 5 is a series of comparative bar graphs comparing the amplitudes of vibrations (abscissa) recorded at various indicated locations on the motorcycle frame (ordinate) at a vibration test speed of 3000 rpm, and illustrating the markedly-reduced vibrations measured using the improved frame as compared with stock frames provided on Harley-Davidson "Softail", "Custom FXR" and "Stock FLHT" models.

DESCRIPTION OF THE PREFERRED EMBODIMENTS

Figure 1:
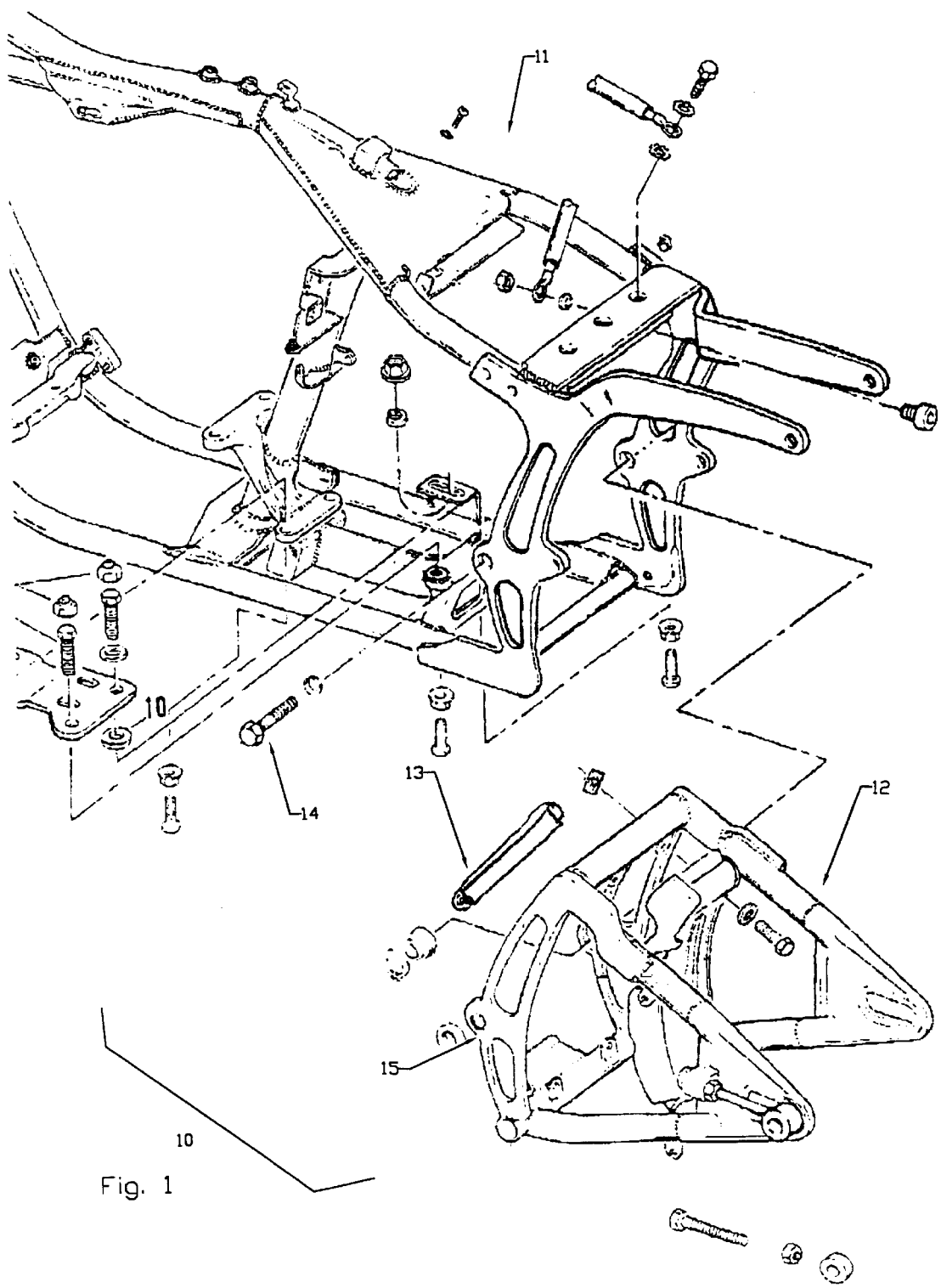
FIG. 1 is an exploded perspective view of a prior art articulated motorcycle frame, showing the joint between the two relatively-movable frame parts as including conventional bolt-type fasteners.

At the outset, it should be clearly understood that like reference numerals are intended to identify the same structural elements, portions, or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up", and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis or elongation, or axis of rotation, as appropriate.

Referring now to the drawings, the present invention broadly provides an art improved cushioned bushing for an articulated two-part motorcycle frame. A prior "Softail" frame is depicted in FIG. 1, and an improved frame incorporating the improved bushing is shown in FIG. 2.

FIG. 1 is an exploded prospective view of a prior art "Softail" frame made by Harley-Davidson. This frame, generally indicated at 10, is shown as having a main part 11 and a rear part 12. These two parts are shown as including various tubes and links that have been assembled to the configuration shown. The rear part 12 is pivotally mounted on the main part 11. The rear wheel of (not shown) is journaled on the rearwardmost portion of the pivotal part 12.

Of salient interest here is that the rear part 12 is pivotally mounted on the main part 11. To this end, a pivot tube 13 was operatively placed between the transversely-spaced forward portions of the rear part. A pair of pivot bolts, severally indicated at 14, with associated washers, were passed through rear frame holes 15, and were received in tapped holes extending into the pivot tube from either end. This pivot tube was, for all intents and purposes, a spacer tube that extended between the two transversely-spaced portions of rear frame 12. It should also be noted that with this prior art arrangement, there was no cushioning of the pivotal joint between the two frame parts. The rear part was operatively mounted on the front part for pivotal movement about the axis of the pivot tube, and suitable shock absorbers and springs acted between the two frame parts. Thus, the motorcycle rear part could pivot about the axis of tube 13, with the amount of pivotal movement being controlled by the shock absorber and spring. However, there was a "hard" (i.e., uncushioned) pivotal connection between the two frame parts. Hence, vibrations from the rear part could be transmitted through this "hard" pivotal connection to the frame front part. This conductive or transmissive path of these vibrations is believed to have contributed to rider fatigue.

FIG. 2 is a fragmentary vertical sectional view of an improved cushioned bushing for use in such a two-piece motorcycle frame. In FIG. 2, the motorcycle frame, generally indicated at 20, is shown as having a first or main part, generally indicated at 21 provided with two transversely-spaced portions, severally indicated at 22, and as having a rear part 23 having two transversely-spaced swing arm portions, severally indicated at 24, arranged adjacent but within frame outer parts 22. Frame part 21 is analogous to main frame part 11 in the prior art embodiment shown in FIG. 1, and frame part 23 is analogous to rear frame part 12 in the prior art embodiment.

Each outer frame part 22 is shown as including a horizontal through-hole, indicated at 25. An outer circular plate, indicated at 26, is adapted to selectively close hole 25. A plurality of fasteners, severally indicated at 28, are arranged in a bolt circle, and are adapted to be received in tapped holes provided in frame parts 22. Hence, by tightening fasteners 28, plate 26 may be moved toward the associated frame part 22 to close hole 25. Each swing arm 24 is also shown as having a horizontal through-hole 29 that is axially aligned with outer frame holes 25. The improved bushing has a horizontal axis x—x that is coincident with the axis of holes 25, 29.

A two-part metal housing is mounted so as to contain each bushing. The left housing is indicated at 30, and the right housing is indicated at 31. Left housing 30 is shown as having a leftward horizontal cylindrical portion 32, and a rightward horizontal cylindrical portion 33 provided with a rightwardmost in-turned annular flange. The left end of cylindrical portion 32 is suitably secured to closure plate 26 for movement therewith. The right portion 33 is secured to an annular mounting plate 34 which, in turn, is suitably secured to swing arm 24. The cylindrical surfaces of housing parts 32 and 33 are coincident with axis x—x.

A dual-durometer urethane cushion is operatively arranged within housing part 30. This cushion is shown as including a relatively-hard inner portion 35 and a stepped outer portion 36. As best shown in FIG. 4, inner portion 35 has an inwardly-facing horizontal cylindrical surface 37, an annular vertical left end face 38, an annular vertical right end face 39, an outer surface that sequentially includes a leftwardly- and outwardly-facing frusto-conical surface 40 extending rightwardly from the outer margin of left end face 38, a horizontal cylindrical surface 41 continuing rightwardly therefrom, a rightwardly-facing annular vertical surface 42, and an outwardly-facing horizontal cylindrical surface 43 continuing rightwardly therefrom to join the outer margin of right end face 39. The inner surface 36 is arranged to face and bear against the left marginal end portion 44 of a horizontally-elongated rod 45 that extends through the improved bushing. The right marginal end portion of the inner bushing part penetrates an opening 46 in housing part 33 and extends therebeyond. Inner portion surface 42 is arranged to bear against the leftwardly-facing surface of housing part 33.

The left cushion outer part 36 is shown as being specially-configured member having an circular vertical left end face 48 adapted to bear against the rightwardly-facing surface of plate 26, an annular vertical right end face 49 adapted to bear against the leftwardly-facing inner flange surface of housing part 33, an outwardly-facing horizontal cylindrical surface 50 adapted to face and bear against the inwardly-facing cylindrical surfaces of housing parts 32 and 33, and a blind hole that is sequentially bounded by a horizontal cylindrical surface 51 extending leftwardly from the inner margin of right end face 49, and inwardly- and rightwardly-facing frusto-conical surface 52 continuing leftwardly therefrom, a rightwardly-facing annular vertical surface 53, a horizontal cylindrical surface 54 continuing leftwardly therefrom, and a rightwardly-facing circular vertical bottom surface 55.

It should be noted that the left cushion housing is segmented, with the two segments 32 and 33 being axially separated from one another. When bolts 28 are tightened, an axial load will be exerted on the cushion, compressing the same between end plate 26 and intermediate tubular spacer member 56. The two opposing annular end faces of the bushing parts 32 and 33 will move toward one another during this tightening operation.

The right cushion is shown as being substantially the same as the left cushion, except that it appears to be somewhat elongated in the axial direction. However, because the operative parts are the same, the primes of the same reference numerals previously described, are used to indicate the mirror image equivalent of such structure.

As indicated above, spacer tube 56 surrounds shaft 45 and has its annular vertical left and right end faces adapted to bear against cushion surfaces 39, 39'.

In the preferred embodiment, each of the cushions is formed of a suitable polyurethane material. However, other equivalent materials could be substituted therefor. Each cushion inner part 35 is relatively hard, and has a hardness of about 75 "D" durometer. This may be formed of a suitable graphite-filled polyurethane. However, each cushion outer part 36 is relatively soft, and may have a hardness of about 60–65 "A" durometer.

Thus, each cushion has portions formed of different hardnesses, preferably formed of polyurethane. Each cushion appears to have a blind recess extending into the cushion from one end thereof to receive and accommodate the proximate marginal end portion of rod 45. Bolts 28 and end plates 26 comprise compression means 58 for exerting axial forces on the cushions. When bolts 28 are tightened, the two cushions will be axially compressed. This will exert forces on the ends of the rod. In other words, forces will be transmitted from each soft outer cushion to each hard inner cushion. These forces will be normal or perpendicular to the interface therebetween. Similarly, forces will be transmitted from the hard cushion 35 to the cylindrical outer surface and circular end face of the rod marginal end portion.

The effect of the improved bushing is illustrated in FIG. 5. FIG. 5 is a bar graph that illustrates the amplitude (expressed in thousands of an inch, or "mils") of vibrations sensed at various locations (i.e., listed on the ordinate) on four different motorcycles. These motorcycles include the "Softail", the "Custom FXR" and the "Stock FLHT", all made by Harley-Davidson. Applicant's improved frame is indicated by the moniker, "Nasty Boy". In each case, the tested bikes were of comparable mileage. The "Nasty Boy" was tested with 14" ape hangers, and 85 horsepower Harley-Davidson engine with 20,000 miles. Each bike was run at approximately 3000 rpm on a dynamometer, and the amplitude of the vibrations at the indicated sensing points were measured.

Thus, at the handlebar, the "Softail" indicated a vibration amplitude of 3.5 mils, the "Custom FXR" had an amplitude of 2.4 mils, the "Stock FLHT" had an amplitude of 0.8 mils, and the "Nasty Boy" incorporating the improved bushing had a vibration amplitude of 0.7 mils.

At the front frame down tube, the "Softail" had an amplitude of 4.85 mils, the "Custom FXR" had an amplitude of 3.9 mils, the "Stock FLHT" had an amplitude of 1.3 mils, and the "Nasty Boy" incorporating the improved bushing had an amplitude of 1.2 mils.

At the swing arm, the "Softail" had an amplitude of 2.6 mils, the "Custom FXR" had an amplitude of 2.2 mils, the "Stock FLHT" had an amplitude of 0.8 mils, and the "Nasty Boy" incorporating the improved bushing had an amplitude of 0.6 mils.

At the rear frame upright, the "Softail" had an amplitude of 4.2 mils, the "Customer FXR" had an amplitude of 3.4 mils, the "Stock FLHT" had an amplitude of 0.8 mils, and the "Nasty Boy" incorporating the improved bushing had an amplitude of 0.6 mils.

Thus, in each case, the "Nasty Boy" incorporating the improved cushioned bushing had substantially less vibration at the indicated measurement locations than the other stock bikes to which it was compared. Hence, the improved bushing is believed to contribute substantially to a reduction in the vibration sensed at the various locations of the motorcycle frame.

MODIFICATIONS

The present invention contemplates that many changes and modifications may be made. For example, while it is presently preferred to us a dual-durometer polyurethane to achieve the cushioning, other elastomeric materials might be possibly substituted therefor. Also, the invention contemplates that the hardness of the respective cushioning parts may be changed or varied. The particular shape and configuration of the cushion and housing parts may also be modified, as may the means for axially compressing the cushions.

Therefore, while the presently preferred form of the improved bushing has been shown and described, and several modifications thereof discussed, persons skilled in this art will readily appreciate that various additional changes and modifications may be made without departing from the spirit of the invention, as defined and differentiated by the following claims.

What is claimed is:

1. In a motorcycle frame having a first part and having a second part mounted for pivotal movement relative to the first part about an axis, the improvement which comprises:
    a cushioned bushing operatively arranged between said frame parts for enabling pivotal movement therebetween and for damping vibrations transmitted therebetween, said bushing having
    a rod substantially coincident with said pivotal axis;
    a first cushion provided with a blind recess for receiving one marginal end portion of said rod;
    a second cushion provided with a blind recess for receiving another marginal end portion of said rod; and
    compression means for exerting axial forces on said cushions for creating forces between said cushions and said rod marginal end portions such that the transmission of vibrations between said frame parts will be reduced.

2. The improvement as set forth in claim 1 wherein each cushion has an inner part of a relatively hard material, and an outer part of a relatively soft material.

3. The improvement as set forth in claim 2 wherein said relatively hard material has a hardness of about 75 "D" durometer.

4. The improvement as set forth in claim 2 wherein said relatively soft material has a hardness of about 60–65 "A" durometer.

5. The improvement as set forth in claim 2 and further comprising a frusto-conical surface between said relatively hard and relatively soft cushion parts.

6. The improvement as set forth in claim 2 and further comprising a cylindrical surface between said relatively hard and relatively soft cushion parts.

7. The improvement as set forth in claim 2 and further comprising an annular surface between said relatively hard and relatively soft cushion parts.

8. The improvement as set forth in claim 1 wherein at least one marginal end portion of said rod penetrates the relatively hard inner cushion part and is received in the relatively soft outer cushion part.

9. The improvement as set forth in claim 2 wherein said cushioned inner and outer parts are formed of polyurethane materials.

\* \* \* \* \*